Nov. 14, 1950     N. F. DEWAR     2,530,047
SLIDE RULE
Filed June 27, 1946
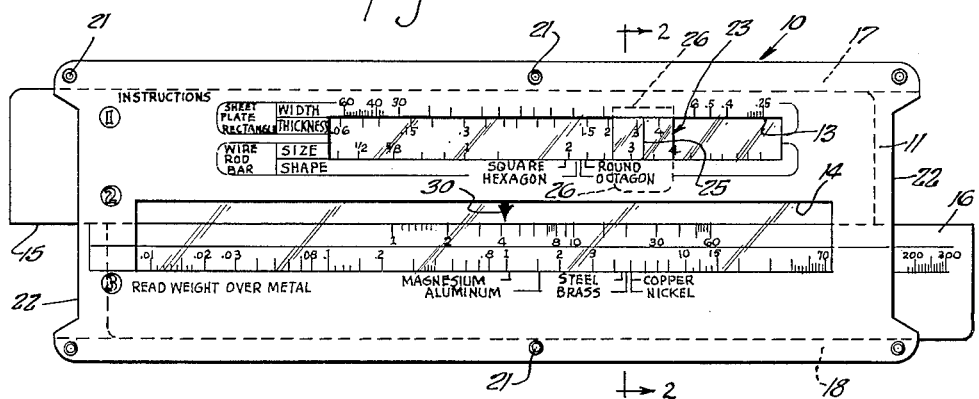
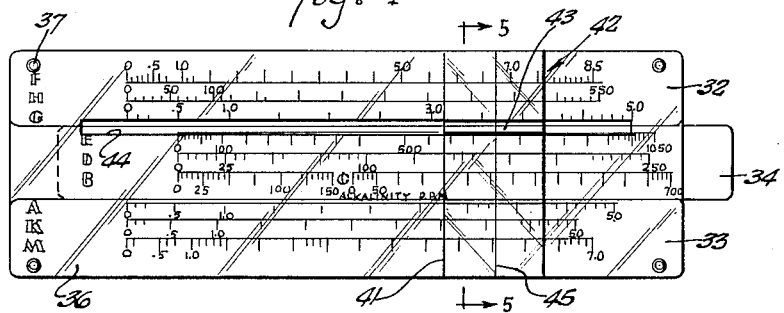
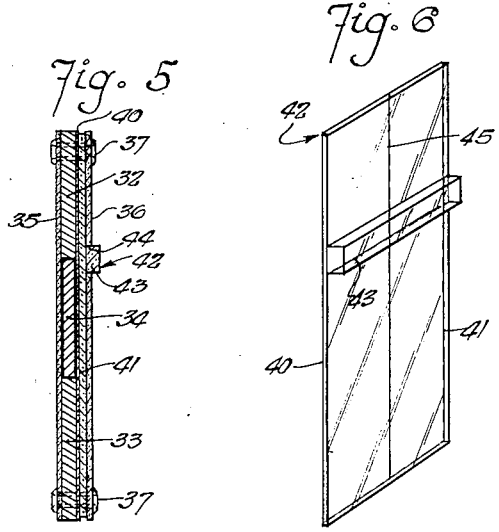
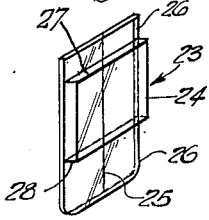
INVENTOR.
Norman F. Dewar
BY Thiess Olson &
Mecklenburger
Attys.

Patented Nov. 14, 1950

2,530,047

UNITED STATES PATENT OFFICE 2,530,047

SLIDE RULE

Norman F. Dewar, Gages Lake, Ill., assignor to Graphic Calculator Company, Chicago, Ill., a corporation of Illinois Application June 27, 1946, Serial No. 679,819

12 Claims. (Cl. 235—70)

This invention relates to a slide rule, and more particularly to a rule of the type having an elongated fixed scale and an elongated movable scale, and a cursor including a hairline manually correlatable with both scales to effect readings therefrom in computing data.

Slide rules of the type aforesaid are available with a cursor overlying the fixed and movable scales, the cursor having marginal flanges engageable over the two longitudinal opposing outermost edges of the rule to retain the cursor in proper slidable relation, and to preserve the necessary right-angled position of the hairline with respect to the scales, as is understood. Such cursors involve certain disadvantages. For example, the rule is not ordinarily provided with end stops and the cursor may become dislodged from the rule and lost, or undue wear along the engaged edges and flanges will disturb the accuracy.

Moreover, certain types of special rules for use in business have come into vogue during the past few years, these usually being made of rigid cardboard for cheapness, particularly because they are often given away as an advertising medium. To facilitate manufacture and to provide an inexpensive instrument, the fixed scales are printed on one or both margins of an elongated aperture and the sliding scale is similarly printed and arranged below or adjacent to the fixed scale, being retained by suitable cardboard panels or covers secured to the fixed scale. In connection with rules of the aforesaid apertured type, it is distinctly disadvantageous to utilize a cursor overlying the fixed scale, since the hairline is spaced from the movable scale by the thickness of the material forming the fixed scale and parallax interferes with accurate readings.

Accordingly, one of the principal objects of my invention is to provide a slide rule having a body portion bearing one or more fixed scales and a member slidable with respect to the body and also bearing a scale or scales. The body is so arranged as to include an elongated slot through which the graduations of the movable scale are visible and whereby the respective movable and fixed sets of graduations may be aligned for computation. A cursor having the customary hairline is provided with a principal part slidably engageable with the edges of the slot to maintain the hairline perpendicularly to the scales, and with another part lying interjacent the fixed and movable scales to retain the cursor in operative position.

Another object is the provision of a slide rule having a body including a fixed scale disposed along one margin of a slot in the body, the slot exposing the scale carried on the movable member, and a cursor as aforesaid, the movable scale being protected against the frictional wear imposed by the cursor by providing a sheet of transparent material intermediate the cursor and movable scale, and which sheet prevents disturbance of a preset condition of the cursor upon shifting of the movable scale.

Still a further object is to provide an alternate form of slide rule embodying my invention in which the fixed and movable scales are disposed in parallel edge-to-edge relation and the cursor is arranged thereabove. The cursor is retained by a transparent cover overlying the scales and attached to the fixed scales, and is guided by having a thickened portion slidably engageable in a slot in the cover, the thickened portion preferably extending beyond the outer surface of the cover to facilitate its engagement by the fingers.

Other and further objects will appear from the following description and the drawing herewith, in which latter:

Fig. 1 is an elevational view of one form of the slide rule embodying my invention;

Fig. 2 is a cross-sectional view taken in the plane represented by the line 2—2 of Fig. 1;

Fig. 3 is a detail in perspective of the cursor used with the form of Fig. 1;

Fig. 4 is an elevational view of an alternative form of slide rule embodying my invention;

Fig. 5 is a cross-sectional view taken in the plane represented by the line 5—5 of Fig. 4; and Fig. 6 is a detail in perspective of the cursor used with the form of Fig. 4.

Referring first to the exemplificative form of Figs. 1 and 2, there is shown a body 10 comprising a front scale-bearing member 11 (for convenience sometimes hereinafter referred to as the fixed scale) of calendered cardboard or other suitable material having imprinted thereon the scale or scales, indicia and instructions utilized for the particular rule. In the example shown, such scales relate to computations involving weights of metal bars and rods, but it will be understood that scales for other purposes may be used, the particular scales having no bearing on the features of my invention. The scales and other printed matter are disposed adjacent the margins of the elongated slots 13 and 14 cut into the member 11. Underlying the member 11 are the movable scale members 15 and 16, respectively, also preferably of calendered cardboard and having indicia and scales printed thereon, the same being visible through the slots 13 and 14 as the members 15 and 16 are operated longitudinally with respect to the fixed scales.

The movable scales 15 and 16 are guided and retained edgewise partly by edge-to-edge contact between them and partly by retaining strips 17 and 18, there being a rigid back member 20 to support and retain the members 15 and 16 in operative position against the member 11. Members 11, 17, 18 and 20 are fixedly united by rivets 21 therethrough. Notches 22 are provided at both ends of members 11 and 20 to permit grasping by the fingers of the members 15 and 16.

To correlate readings on the fixed and movable scales for computation, I provide a novel form of cursor 23 (Fig. 3) including a body portion 24 of thickness at least equal to the thickness of the member 11 and preferably slightly thicker to facilitate digital engagement thereof. Cursor 23 may be of any suitable transparent material, e. g., a plastic composition, and has a hairline 25 for correlating readings on the fixed and movable scales as is understood in this art, the hairline being engraved into the rear face of the cursor to avoid parallax.

Integral with body 24 is the retaining portion 26, in this case shown as a thin leaf cemented to the body 24, but which may obviously be initially molded therewith. In any event, the portion 26 extends on both sides of the body 24 to provide two flanges underlying the member 11, as shown, whereby the cursor 23 is maintained in slidable relation to the slot 13, the opposed parallel edges 27 and 28 of body 24 engaging the adjacent edges of the slot 13.

For certain types of computations, the cursor 23 is preliminarily set against a scale of the member 11 and the movable scale 15 is shifted to bring an indicium thereof under the hairline 25. To permit such procedure without accidental shifting of the cursor by subsequent movement of the member 15 there is preferably interposed between the member 15 and the cursor 23, a thin sheet of cellophane or similar transparent material which isolates the cursor from the friction of the movable scale. If desired the cellophane or other sheet is continued over the movable scale 16 thereby protecting both movable scales against dirt and wear. Such interpositioned sheet is rugged and will withstand wear practically indefinitely as contrasted with varnish or similar protective coatings applied directly to the scale members.

By providing a cursor lying principally within the slot 13, the outer face of the rule is unencumbered for ease in reading and handling. Moreover, prior types of cursors which are adapted to overlie the outer face of the rule are easily moved by accidental contact or shifting of the rule while it is lying on the worktable so that a reading whose preservation is desired may be disturbed. Since such accidents frequently occur without the person's knowledge, it is evident that erroneous readings resulting therefrom can be a source of considerable inconvenience and irritation. On the other hand, my cursor is protected by lying within the confines of the rule and is not subject to inadvertent disturbance of a reading.

It will be understood that the movable scales cooperate with each other and with the fixed scale through the medium of the indicator 30. Hence, for the particular rule illustrated and described, no second cursor need be provided in connection with the slot 14. However, it will be appreciated that a special type of rule is shown only by way of example and that one or more cursors may be employed, depending upon the performance desired from the instrument.

In Figs. 4, 5, and 6, my invention is shown embodied in a slide rule of somewhat different construction from that heretofore detailed. In this form the fixed scales are carried on body members 32 and 33 disposed in edgewise parallel relation to define a space therebetween and in which space the movable scale member 34 is adapted to slide, but with sufficient friction against the members 32 and 33 to preserve a preselected position thereof, as is understood. Members 32, 33, and 34 may be made of calendered carboard or equivalent rigid material and are maintained in operative relationship by means of a backing part 35 and a facing part 36, there being rivets 37 joining the several parts.

Part 35 is shown as comprising transparent material, e. g., plastic composition, whereby instructional matter, indicia or other graduations imprinted on the reverse faces of the members 32, 33, and 34 may be made visible. It will be comprehended that in the absence of such printed matter, the part 35 may be opaque, or it may be an integral part of member 32 or 33 or both of them.

Overlying the front face of the members 32, 33, and 34 is a thin sheet 40 of transparent material, e. g., cellophane, and positioned intermediate the sheet 40 and part 36 is the thinner portion 41 of the cursor 42, the latter including a thicker or body portion 43 having opposed parallel edges adapted to slidably engage the edges of an elongated slot 44 cut into the facing part 36. Thus the cursor body 43 is provided with a pair of laterally extending flanges constituted by the portion 41. Body 43 and portion 41 may be cemented as shown, or formed integrally, as by molding. It will be noted that portion 43 of the cursor is thicker than the part 36 whereby it may readily be engaged by the fingers, and that the entire cursor is fabricated from transparent material. The usual hairline 45 is provided.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A slide rule comprising a body portion having an elongated slot, a scale carried by said body portion, a scale movable with respect to said body portion and underlying said portion, and a cursor having a hairline and movable with respect to both said scales, said cursor having parallel shoulders slidably engageable with the longitudinal margins of said slot and having at least one flange lying between said body portion and movable scale.

2. A slide rule comprising a body portion having an elongated slot and a scale adjacent said slot, a scale movable with respect to said body portion and underlying said portion, and a cursor having a hairline co-operative with said scales, said cursor including a relatively thicker portion having parallel edges for engagement with the sides of said slot and a relatively thinner portion interjacent said body portion and movable scale.

3. A slide rule comprising a fixed portion having an elongated slot and a scale marginally adjacent said slot, a scale movable with respect to said fixed portion and underlying said portion, and a cursor having a hairline co-operative with said scales, said cursor having a body substantially coextensive in thickness and width with the edges of said slot for guiding the cursor in said slot, and said cursor having at least one flange lying between said fixed portion and movable scale for retaining said cursor in co-operative relation with said scales.

4. A slide rule comprising a body portion having scale indicia thereon, a transparent indicia protecting layer superimposed on said body portion, a transparent outer member overlying said layer, said member having a slot, a cursor having a hairline co-operative with said scale and including a portion slidably engaged with said slot and a retaining portion underlying said member, and a member carried by said body portion and slidable with respect thereto and having scale indicia thereon; said cursor correlating readings on the two said scale indicia.

5. A slide rule comprising a body portion having scale indicia thereon, a transparent indicia protecting layer superimposed on said body portion, a transparent outer member overlying said layer, said member having a slot, a scale positioned intermediate said layer and member and movable with respect to said body portion, a cursor having a hairline co-operative with said scales and including a portion slidably engaged with said slot and a retaining portion lying between said member and said layer.

6. A slide rule comprising in combination a body member, an element slidable with respect to said body member and having a scale thereon, a transparent cover overlying said element, a second body member overlying said cover and having a scale thereon, said body members and cover being secured together, said second body member having an elongated slot to expose to view predetermined portions of the scale on said element, and a cursor having a hairline and slidable in said slot and including a thickened portion presenting parallel guiding edges to the margins of said slot, the thinner portion of said cursor lying intermediate said second body member and cover.

7. A cursor adapted for use with a slide rule having at least one fixed scale adjacent a margin of a slot exposing the scale of the slidable member co-operating with said fixed scale, which cursor comprises a body portion disposed within the slot and having parallel shoulders for guiding engagement with the margins of the slot and at least one laterally extending flange positioned intermediate said fixed and slidable scales, said cursor having a hairline for correlating readings between said scales.

8. A slide rule comprising in combination an upper body member including portions defining a channel and at least one scale disposed along one edge of said channel, an element slidable with respect to said body member and bearing a second scale visible through said channel, and a transparent cursor having shoulders adapted to slidably engage the sides of said channel and a laterally extending retaining flange underlying said body member, said cursor having a hairline for correlating readings of said scales.

9. A slide rule comprising in combination an upper body member including portions defining a channel and at least one scale disposed along one edge of said channel, an element slidable with respect to said body member and bearing a second scale visible through said channel, and a transparent cursor having a parallelepipedic body, two parallel faces thereof being slidably engageable with the sides of said channel and the upper face of said cursor body projecting beyond the upper face of said body member, and said cursor body including a laterally extending flange underlying said body member.

10. A slide rule comprising in combination a fixed scale and a second scale movable with respect to said first scale and disposed in parallel edgewise relation thereto, a transparent cover overlying said scales and secured to said fixed scale, a cursor having a hairline and slidable with respect to said two scales and having a thickened mid-portion including parallel guiding edges and a thinner flange extending from said mid-portion, a second transparent cover overlying said first cover and said flange and having an elongated slot, the said guiding edges being guided in said slot.

11. In a slide rule having co-operating fixed and sliding scales, two juxtaposed layers of sheet material, one of said layers having a longitudinally-extending slot-like opening therethrough having spaced longitudinally-extending parallel edges and a cursor having opposite parallel edges engaging parallel edges of said opening, respectively, to guide the cursor in its longitudinal movement, said cursor having a flange portion extending from one of its parallel edges lying between said juxtaposed layers to hold the cursor in the opening.

12. In a slide sule having co-operating fixed and sliding scales, two juxtaposed layers of sheet material, one of said layers having a longitudinally-extending slot-like opening therethrough having spaced longitudinally-extending parallel edges and a cursor having opposite parallel edges engaging parallel edges of said opening, respectively, to guide the cursor in its longitudinal movement, said cursor having a flange portion extending from each of its parallel edges lying between said juxtaposed layers to hold the cursor in the opening.

NORMAN F. DEWAR.

REFERENCES CITED

The following references are of record in the file of this patent:

UNITED STATES PATENTS

| Number | Name | Date |
|---|---|---|
| 535,375 | Hill | Mar. 12, 1895 |
| 1,181,672 | Keuffel | May 2, 1916 |
| 1,599,582 | Moyer | Sept. 14, 1926 |